United States Patent [19]

Veillette

[11] Patent Number: 5,850,057
[45] Date of Patent: Dec. 15, 1998

[54] ELECTROMAGNETICALLY CONTROLLED LOAD CELL

[75] Inventor: Robert J. Veillette, Akron, Ohio

[73] Assignee: The University of Akron, Akron, Ohio

[21] Appl. No.: 707,411

[22] Filed: Sep. 4, 1996

[51] Int. Cl.⁶ .............................. G01G 23/10; G01G 1/38
[52] U.S. Cl. ............................................ 177/212; 177/185
[58] Field of Search .............................. 177/185, 210 EM, 177/211, 212, 213, 214, 215, 216 R, 184

[56] References Cited

U.S. PATENT DOCUMENTS

| | | | |
|---|---|---|---|
| 1,717,462 | 6/1929 | Nagaoka et al. | 177/185 |
| 2,538,369 | 1/1951 | Leary | 177/185 |
| 3,519,095 | 7/1970 | Tomes | 177/210 EM |
| 3,986,571 | 10/1976 | Strobel et al. | 177/185 |
| 5,115,877 | 5/1992 | Komoto | 177/212 |
| 5,141,064 | 8/1992 | Willemsen et al. | 177/184 |
| 5,539,157 | 7/1996 | Kobayashi | 177/50 |
| 5,569,887 | 10/1996 | Naito et al. | 177/184 |

*Primary Examiner*—Randy W. Gibson
*Attorney, Agent, or Firm*—Renner, Kenner, Greive, Bobak, Taylor & Weber

[57] ABSTRACT

A weighing apparatus capable of actively weighing a load in a rapid and accurate manner is presented. The weighing device includes an electromechanical linear actuator coupled to a load cell, wherein the output of the load cell is received by a feedback controller that generates an input signal received by the electromechanical linear actuator. A processor receives both the output signal and a measured value of the input signal and derives therefrom a weight for the load coupled to the weighing device. By employing the load cell output for feedback, the need for a position sensor is eliminated. The response time of the apparatus is enhanced by the electromechanical linear actuator which functions to quickly bring the load being weighed to a mechanical equilibrium position. Weight values may also be obtained by forcing one of the input or output signals to zero and then measuring the other of the signals.

14 Claims, 2 Drawing Sheets

ELECTROMAGNETICALLY CONTROLLED LOAD CELL

TECHNICAL FIELD

The invention herein resides generally in the art of weighing devices. More particularly, the present invention relates to weighing devices which measure the weight value of a load by employing a load cell coupled to an electromechanical linear actuator such as a voice coil actuator. Specifically, the present invention relates to a weighing device which derives the weight value of a load from a measured value of the current passing through the electromechanical linear actuator and an output generated by the load cell.

BACKGROUND ART

Weighing devices such as scales, load cells and the like are employed to determine the weight of an object. Accurate weight values are required to determine such things as shipping costs, the volume of objects in a container and to confirm the weight of an object in high-speed manufacturing processes. For example, food items are typically sold by weight in a suitably sized container. As the container is filled, a weighing device continuously monitors the weight until the desired weight is obtained. This process requires a fast and accurate weight determination so that the filling process can be stopped at the appropriate moment without overfilling the container. It will be appreciated that a slow weighing scale adds cost to the finished product and slows the packaging or manufacturing process. Moreover, an inaccurate weight determination results in inventory discrepancies and dissatisfied consumers who receive the incorrect amount of a product.

There are various types of weighing scales or instruments currently available. One type of weighing scale employs strain-gauge load cells. These load cells employ materials which are deflected by the load to generate an electrical output that is correlated to a weight value of the load. Load cells are passive devices that must settle to an equilibrium position before an accurate weight value can be derived. These load cell configurations may also require the use of additional look-up tables to properly correlate the non-linear response of the load cell to a weight value. Another type of weighing device employs electromechanical linear actuators, such as voice coils, that generate a current as a load is placed thereon. This current is measured and correlated to a weight value for the load. One major drawback of this type of scale is that the position of the weighing tray surface must be returned to exactly the original starting position each time a weight reading is taken. This is done so that mechanical restoring forces, such as springs and the like, that act on the load will have no effect on the weight measurement. As such, the return of the tray to its original position necessitates the use of an accurate position sensor and a control system that minimizes the position error. It will be appreciated that position sensors are costly and that implementation of the control system further slows the weighing process.

One type of weighing device that employs an electromechanical linear actuator and a position sensor is disclosed in U.S. Pat. No. 4,802,541, entitled "Weighing Scale With Voice Coil." This invention incorporates springs to support the tray and an optical sensor for measuring the position of the tray. Primarily, this invention employs a current in the voice coil to return the tray, with the load to be measured, to its original position as determined by the optical sensor. A weight of the load can then be determined from the voice coil current. In an alternative embodiment, the invention determines the weight value from the coil current, the displacement position of the tray and the spring's coefficient of stiffness. For fast weighing in this alternative embodiment, the displacement of the tray would have to be small necessitating very stiff springs. To optimize the accuracy of the weight measurement reading, the resolution of the position sensor would have to be very fine and the coefficient of the spring stiffness would have to be precisely known. Unfortunately, it is difficult to determine the spring stiffness coefficient, which may also fluctuate over a period of time, rendering the weight measurements inaccurate.

Based upon the foregoing, there is a need in the art to provide a weighing device which can quickly determine the weight of a load applied thereto and which employs both a load cell and an electromechanical linear actuator.

Moreover, there is a need in the art for a weighing device that can continuously monitor a changing value of the load such as in a high speed packaging operation.

DISCLOSURE OF INVENTION

In light of the foregoing, it is a first aspect of the present invention to provide an apparatus in the form of an electro-mechanically controlled load cell.

Another aspect of the present invention is to provide an apparatus which quickly determines the weight of a load.

Still a further aspect of the present invention, as set forth above, is to provide an apparatus with an electromechanical linear actuator coupled to a load cell.

Still yet another aspect of the present invention, as set forth above, is to pass an input signal through the electromechanical linear actuator for stabilizing deflection of the load cell when a load is applied thereto.

An additional aspect of the present invention, as set forth above, is to provide a feedback controller that receives output from the load cell, applies a control function thereto and generates the input signal received by the electromechanical linear actuator to re-establish mechanical equilibrium of the load cell when a load is applied thereto.

Still yet another aspect of the present invention, as set forth above, is to provide a processor which measures the input signal to the electromechanical linear actuator and the load cell output to derive a weight value for the load coupled to the apparatus.

Yet a further aspect of the present invention, as set forth above, is to employ a control function in the feedback controller which adjusts the steady-state value of the input signal to the electromechanical linear actuator to about zero with the load coupled thereto, wherein the processor measures just the load cell output to derive a weight value for the load.

Still yet another aspect of the present invention, as set forth above, is to employ a control function in the feedback controller which adjusts the steady-state value of the load cell output to about zero with the load coupled thereto, wherein the processor measures just the input signal to derive a weight value for the load.

The foregoing and other aspects of the invention which shall become apparent as the detailed description proceeds are achieved by an electromechanically controlled load cell, comprising: means for weighing a load to generate a first weighing signal; means for controlling said weighing means to generate a second weighing signal; and means for processing said first weighing signal and said second weighing signal to generate a load measurement value for the load.

Another aspect of the invention which will become apparent herein is obtained by a weighing device, comprising: an electromechanical linear actuator receiving an input signal; a load cell coupled to the electromechanical linear actuator, the load cell generating an output signal when a load is coupled to one of the electromechanical linear actuator and the load cell; a feedback controller receiving the output signal and generating the input signal received by the electromechanical linear actuator, the feedback controller adjusting the input signal to bring the load to rest; and a processor for receiving the output signal and the input signal, the processor deriving a load weight value of the load from the input signal and the output signal.

Other aspects of the invention which will become apparent herein are obtained by an apparatus, comprising: an electromechanical linear actuator having a housing which carries a wire coil that receives an input signal, the housing coupled to a magnet assembly that is movable in response to the input signal; a load cell coupled to the magnet assembly and received within the housing, the load cell generating an output signal; a feedback control system receiving the output signal and generating the input signal, the wire coil stabilizing the position of the magnet assembly when a load is coupled to one of the electromechanical linear actuator and the load cell; and a processor for receiving the output signal and the input signal, the processor deriving a load weight value of the load from the input signal and the output

BRIEF DESCRIPTION OF THE DRAWINGS

For a complete understanding of the objects, techniques and structure of the invention, reference should be made to the following detailed description and the accompanying drawings where.

BEST MODE FOR CARRYING OUT THE INVENTION

Figure 1:
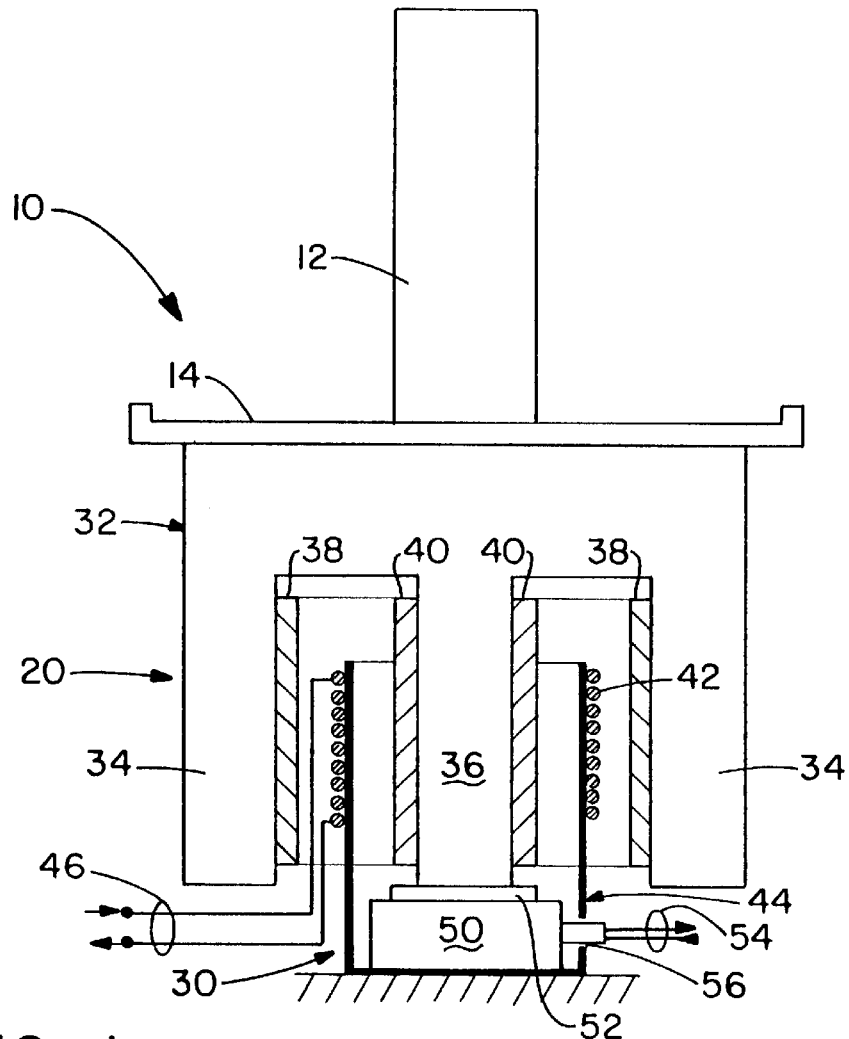
FIG. 1 is a schematic cross-sectional view of the apparatus of the invention.

Referring now to the drawings and more particularly to FIG. 1, it can be seen that an apparatus in the form of an electromechanically controlled load cell is designated generally by the numeral 10. As shown, a load 12 is coupled to the apparatus 10 which determines a weight value for the load. It will be appreciated that the apparatus 10 may weigh an individual load 12 as needed, or may weigh loads that are continuously applied to the apparatus, as in a manufacturing process, until a predetermined weight value is attained. In the latter instance, once the predetermined weight value is attained, the load 12 is transferred to the next station in the manufacturing process and a new weighing sequence may be initiated. A tray 14 may be employed to facilitate the coupling of the load 12 to the apparatus 10. The tray 14 facilitates the weighing of loads made up of a plurality of pieces. The tray 14 may also be used when the load is of such a shape that it would not easily come to rest upon the apparatus 10. It will be appreciated that the weight of the tray 14 is not included in the weight measurement of the load 12.

The apparatus 10 includes an electromechanical linear actuator 20, which is commonly referred to as a voice coil, and a load cell 30 which is coupled thereto. In the preferred embodiment, the electromechanical linear actuator 20 is adhesively bonded to the load cell 30. Of course, other means for securing the electromechanical linear actuator 20 to the load cell 30 may be employed. Although the apparatus 10 is shown with the load cell 30 received within the electromechanical linear actuator 20, it will also be appreciated that any coupling of these two components may be used to obtain a measured weight value of the load 12.

The electromechanical linear actuator 20 includes a magnet assembly 32 which has an outer arm 34 that surrounds an inner column 36. The magnet assembly 32 is constructed of a material providing low reluctance to magnetic flux, and is typically provided in an annular shape, although any shape may be employed. Disposed around the interior surface of the outer arm 34 is a permanent magnet 38, the north pole of which faces the south pole of a permanent magnet 40 disposed around the inner column 36. Received within the facing relationship between the permanent magnets 38 and 40 is a wire coil 42 that is carried by a core housing 44. The wire coil 42 is shown disposed on the outer surface of the core housing 44; however, it could also be disposed on the housing's inner surface. The core housing 44 is supported by a ground surface or any other stable platform upon which a weighing apparatus is maintained. A pair of coil leads 46 are connected to respective ends of the wire coil 42, wherein an input signal, such as a current, is provided to the wire coil.

The load cell 30 includes a base 50 which is received within the core housing 44. Received within the base 50 is a deflectable member 52 which is coupled to the inner column 36 of the magnet assembly 32 of the electromechanical linear actuator 20. Of course, the deflectable member 52 may be coupled to another portion of the magnet assembly 32 of the electromechanical linear actuator 20 or the load 12. A pair of load cell leads 54 extend from the load cell 30 and are directed through an opening 56 in the core housing 44. The load cell leads 54 carry a load cell output signal that correlates to the amount of deflection of the deflectable member 52 when the load 12 is coupled to the apparatus 10. In other words, the load cell 30, by itself, passively weighs the load 12 to generate the load cell output signal.

Figure 2:
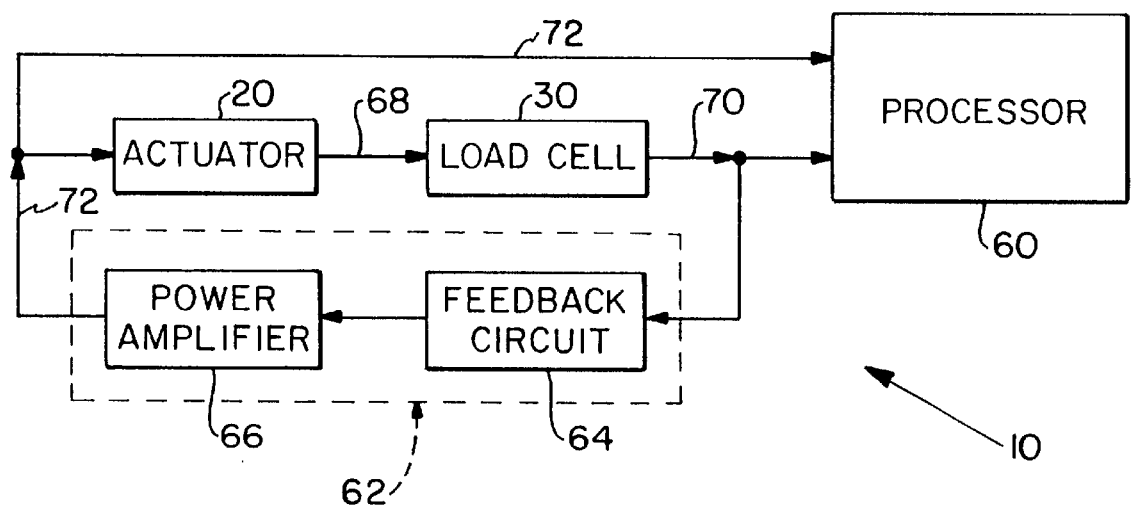
FIG. 2 is a control system diagram of the apparatus of the invention.

Referring now to FIG. 2, the control system employed by the apparatus 10 to generate a load weight value of the load 12 is presented. The apparatus 10 is coupled to a processor 60 which contains the necessary hardware, software and memory to control the operation of the apparatus 10 and derive a load weight value of the load 12. Also connected to the apparatus 10 is a feedback controller 62 which includes a feedback circuit 64 connected to a power amplifier 66 that boosts the output accordingly. The feedback circuit 64 employs a control function to determine the appropriate electromechanical linear actuator current for quickly re-establishing mechanical equilibrium when the load 12 is coupled to the apparatus 10. It will also be appreciated that the feedback circuit (or control function) may be implemented as a part of the hardware or software of the same processor 60, or separately. The current through the electromechanical linear actuator 20 generates electromagnetic forces that bring the load 12 to rest as quickly as possible. Together with the feedback controller 62, the electromechanical linear actuator 20 controls the movement of the load cell 30 and in particular the deflectable member 52 to more quickly weigh the load 12. The control function may also be set to force the deflectable member 52 to its original unloaded position after a load is placed thereon or to allow the deflectable member to be the sole force supporting the load 12.

In use, the load 12 is placed on the apparatus 10 and in particular, the magnet assembly 32, which experiences a resulting deflection 68. The deflection 68 is received by the deflectable member 52 of the load cell 30 which generates an output signal 70 corresponding to the movement of the deflectable member 52. The output signal 70 is received by the processor 60 and also by the feedback controller 62. The feedback controller 62 generates an input signal 72 which is generated by the control function provided by the feedback circuit 64 and that is returned to the electromechanical linear actuator 20 and in particular the wire coil 42. The input signal 72 is also received by the processor 60. Accordingly, as the load 12 is applied to the apparatus 10, the electromechanical linear actuator 20 generates an electromagnetic force that brings the load 12 to rest as quickly as possible. Thus, the load 12 is supported by the mechanical force transmitted through the load cell 30 and by the steady state electromagnetic force generated by the electromechanical linear actuator 20.

Figure 3A:
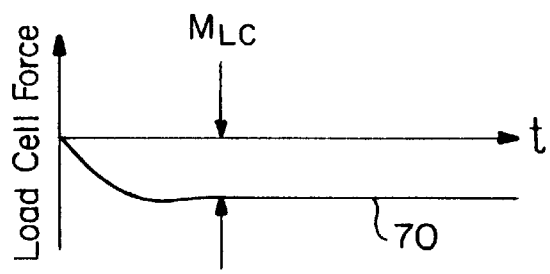
FIG. 3A is a graphical representation of a load cell response curve in a preferred use of the invention.
Figure 3B:
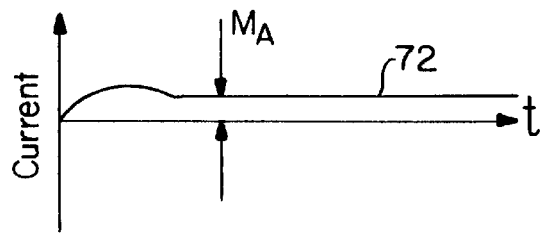
FIG. 3B is a graphical representation of an actuator current response curve in a preferred use of the invention.

The processor 60 derives the load measurement value from the load cell output signal 70 and the measured value of the input signal 72 which correlates to the current passing through the wire coil 42. FIGS. 3A and 3B present the preferred load measurement technique wherein $M_{LC}$ designates the measurement of the displacement value of the load cell 30 by the processor 60, and $M_A$ designates the measurement of the current value of the electromechanical linear actuator 30 by the processor 60. Both measurements $M_{LC}$ and $M_A$ are taken at their respective steady-state values. In other words, the load measurement value is derived from a reaction force generated by the load cell 30 and a reaction force generated by the electromechanical linear actuator 20. It will be appreciated that the electromechanical linear actuator 20 functions to bring the load 12 to an equilibrium position as quickly as possible, while allowing the load cell 30 to absorb some of the force generated by the load 12. It will further be appreciated that this is an active control system to quickly determine a weight value for the load.

Figure 4A:
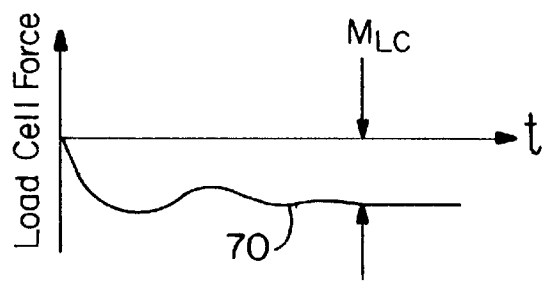
FIG. 4A is a graphical representation of a load cell response curve in an alternative use of the invention.
Figure 4B:
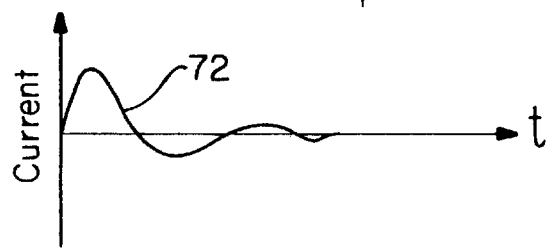
FIG. 4B is a graphical representation of an actuator current response curve in an alternative use of the invention.
Figure 5A:
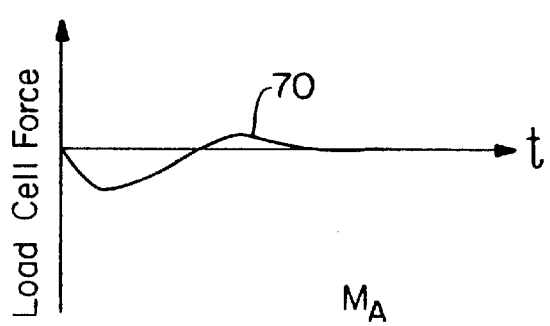
FIG. 5A is a graphical representation of a load cell response curve in another alternative use of the invention.
Figure 5B:
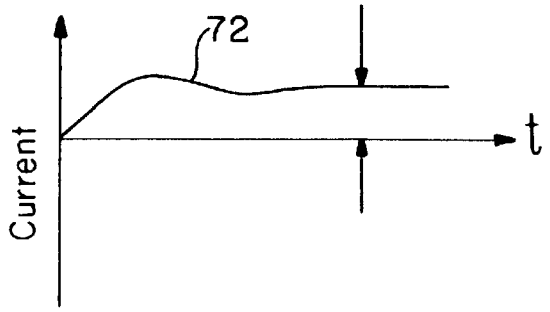
FIG. 5B is a graphical representation of an actuator current in another alternative use of the invention.

In an alternative technique, the electromechanical linear actuator 20 may provide active damping to the load cell 30 during the transient response phase only with the load 12 coupled thereto. As seen in FIGS. 4A and 4B, the processor 60 only derives the load weight value from the output signal 70 when the steady state value of the input signal 72 is equal to zero. $M_{LC}$ designates the measurement of the displacement value of the load cell 30 by the processor 60. In a second alternative technique, the electromechanical linear actuator 20 may be used to return the load cell 30 to its original unloaded position after the load 12 is place thereon. As seen in Figs. 5A and 5B, the processor 60 only derives the load weight value from the input signal 72 when the steady state value of the output signal 70 is equal to zero. $M_A$ designates the measurement of the current value of the electromechanical linear actuator 20 by the processor 60.

Although these alternative methods may take longer to determine a weight value for the load 12 than the preferred method, they allow for the simplification of the hardware and software contained within the processor 60, since the processor 60 only needs to measure one signal.

It is apparent then from the above description of the operation of the apparatus 10 that the problems associated with previous weighing devices have been overcome. In particular, the apparatus 10 quickly and accurately measures the weight of a mechanical load even as the load increases, such as in packaging operations. By employing a feedback control loop, the operation of the electromechanical linear actuator 20 and the load cell 30 complement each other. In other words, the load cell 30 stabilizes the electromechanical linear actuator 20 mechanically and provides an electrical output that eliminates the need for a position sensor, while the electromechanical linear actuator 20 employs electromagnetic forces to speed up the response of the load cell 30. It will also be appreciated that the present invention is advantageous in that it is less complicated and less expensive than other active-controlled electromechanical weighing schemes which require a separate position sensor and mechanical support. The apparatus 10 also permits weighing of loads within the linear range of the load cell 30, whereas prior art load cells required a non-linear look-up table to interpret current measurements from the electromechanical linear actuator and position measurements from the position sensor.

Thus, it can be seen that the objects of the invention have been satisfied by the structure presented above. It should be apparent to those skilled in the art that the objects of the present invention could be practiced with any type of electromechanical linear actuator and any type of load cell.

While the preferred embodiment of the invention has been presented and described in detail, it will be understood that the invention is not limited thereto or thereby. Accordingly, for an appreciation of the true scope and breadth of the invention, reference should be made to the following claims.

What is claimed is:

1. An electromechanically controlled load cell, comprising:

mechanical means for weighing a load to directly generate a first weighing signal in passive response to the load;

means for controlling said mechanical weighing means thereby generating a second weighing signal; and means for separately processing said first weighing signal and said second weighing signal to generate a load measurement value for the load.

2. The electromechanically controlled load cell according to claim 1, wherein said controlling means comprises:

feedback means for receiving said first weighing signal to generate said second weighing signal; and an electromechanical linear actuator coupled to said feedback means and receiving only said second weighing signal.

3. The electromechanically controlled load cell according to claim 2, wherein said mechanical weighing means comprises a load cell physically deflected by the load coupled to one of said load cell and said electromechanical linear actuator, said electromechanical linear actuator controlling the resulting physical deflection of said load cell, said processing means separately measuring the steady state values of said first and second weighing signals when deriving the load measurement value.

4. The electromechanically controlled load cell according to claim 3, wherein said electromechanical linear actuator actively dampens said load cell during said load cell's transient response phase and wherein said processing means derives the load measurement value from said first weighing signal when the steady state value of said d second weighing signal measured by said processing means is about equal to zero.

5. The electromechanically controlled load cell according to claim 3, wherein said electromechanical linear actuator returns said load cell to its original unloaded position after a load is placed thereon, said processing means deriving the load measurement value from said second weighing signal when the steady state value of said first weighing signal measured by said processing means is about equal to zero.

6. A weighing device, comprising:

an electromechanical linear actuator receiving an input signal;

a mechanical load cell coupled to said electromechanical linear actuator, said mechanical load cell directly generating an output signal in passive response to a load coupled to one of said electromechanical linear actuator and said mechanical load cell;

a feedback controller receiving said output signal and generating said input signal received by said electromechanical linear actuator, said feedback controller adjusting said input signal to bring the load to rest; and a processor for receiving said output signal and said input signal, said processor deriving a load weight value of the load from said input signal and said output signal, wherein said input signal and said output signal are separately received by said processor.

7. The weighing device according to claim 6, wherein said load cell is received within said electromechanical linear actuator.

8. The weighing device according to claim 6, wherein said input signal is a current, said electromechanical linear actuator bringing said load cell to rest with said load coupled thereto and wherein said processor measures the steady state values of said current and said output signal when deriving the load weight value.

9. The weighing device according to claim 6, wherein said input signal is a current, said electromechanical linear actuator dampens said load cell during said load cell's transient response phase and wherein said processor derives the load weight value from said output signal when the steady state value of said current is about equal to zero.

10. The weighing device according to claim 6, wherein said input signal is a current and said electromechanical linear actuator returns said load cell to its original unloaded position after a load is placed thereon, and wherein said processor derives the load weight value from said input signal when the steady state value of said output signal is about equal to zero.

11. An apparatus, comprising:

an electromechanical linear actuator having a housing which carries a wire coil that receives an input signal, said housing coupled to a magnet assembly that is movable in response to said input signal;

a load cell coupled to said magnet assembly and received within said housing, said load cell generating an output signal representing a first component of a load weight value;

a feedback control system receiving said output signal and generating said input signal, said wire coil stabilizing the position of said magnet assembly when a load is coupled to one of said electromechanical linear actuator and said load cell without the benefit of a position sensor, said input signal representing a second component of the load weight value; and a processor for separately receiving said output signal and the value of said input signal, said processor deriving a load weight value of the load from said input signal and said output signal by combining said first and second components.

12. The apparatus according to claim 11, wherein said input signal is a current, said electromechanical linear actuator bringing said load cell to rest with said load coupled thereto and wherein said processor measures the steady state value of said current when deriving the load weight value.

13. The weighing device according to claim 12, wherein said electromechanical linear actuator actively dampens said load cell during said load cell's transient response phase and wherein said processor derives the load weight value from said output signal when the value of the steady state value of said current is about equal to zero.

14. The weighing device according to claim 12, wherein said electromechanical linear actuator returns said load cell to its original unloaded position and said processor measures the load weight value from said input signal when the steady state value of said input signal when the steady state value of said output signal is about equal to zero.

* * * * *